UNITED STATES PATENT OFFICE.

WILLIAM JONES, OF SAN FRANCISCO, CALIFORNIA.

HYDRAULIC PORTLAND CEMENT.

SPECIFICATION forming part of Letters Patent No. 287,941, dated November 6, 1883.

Application filed June 22, 1883. (No specimens.)

*To all whom it may concern:*

Be it known that I, WILLIAM JONES, of the city and county of San Francisco, State of California, have invented an Improvement in Manufacture of Hydraulic Portland Cement; and I hereby declare the following to be a full, clear, and exact description thereof.

My invention relates to a new and useful process of manufacturing or forming what is known in commerce as "hydraulic Portland cement;" and it consists in the treatment of argillaceous limestone or dolomite containing an excessive quantity of clay (silicate of alumina) with lime or its carbonate, and in subsequent steps, as I shall now fully explain.

Heretofore Portland cement has usually been made by an artificial mixture of lime and clay. In argillaceous limestone or dolomite there occurs this mixture naturally; but seldom are the proportions requisite for the manufacture of the cement. More frequently there is too small a quantity of lime and an excess of clay. Consequently such argillaceous limestone or dolomite is worthless for making the cement.

The object of my process is to utilize such limestone or dolomite by adding thereto the requisite amount of lime. For this purpose I add to argillaceous limestone or dolomite in which there is an excess of clay, lime, or its carbonate, grinding and thoroughly mixing in such proportions that the resulting mixture shall contain by analysis from seventy (70) to eighty (80) per cent. of carbonate of lime. I have not herein given the exact proportion of the lime or its carbonate, because these vary according to the quantity of clay entering into the composition of the argillaceous limestone or dolomite. It will require more or less lime or its carbonate in order to produce the result, which must contain, as before stated, from seventy to eighty per cent. of the carbonate of lime. This mixture, after molding into suitable form, I burn in a kiln at a high heat to a clinkered condition, as is usually required for the burning of Portland cement. After this burning, I grind it finely into the cement. In order to obtain a proper mixture, I grind the argillaceous limestone or dolomite in its natural state, and then mix the lime or its carbonate therewith; or in some cases, in order to more easily grind them, I burn them slightly, as in burning lime or natural cements. This previous burning further gives an advantage in the saving of fuel by putting them in condition for quicker burning to a Portland-cement clinker of the mixed molded raw material.

Having thus described my invention, what I claim as new, and desire to secure by Letters Patent, is—

The process of manufacturing hydraulic Portland cement from argillaceous limestone or dolomite containing an excessive quantity of clay, consisting in mixing with said argillaceous limestone or dolomite lime or its carbonate in such quantity that the resulting mixture shall contain seventy to eighty per cent. of carbonate of lime, in molding and then burning said mixture to a clinkered condition, and finally in grinding to a powder, substantially as herein described.

In witness whereof I have hereunto set my hand.

WILLIAM JONES.

Witnesses:
S. H. NOURSE,
C. D. COLE.